United States Patent [19]

Crea et al.

[11] Patent Number: 4,595,492
[45] Date of Patent: Jun. 17, 1986

[54] RECOVERY OF PHOSPHORUS FROM DILUTE WASTE STREAMS

[75] Inventors: David A. Crea, Pocatello, Id.; James A. Robertson, Levittown, Pa.; Jerry A. Keely, Pocatello, Id.

[73] Assignee: FMC Corporation, Philadelphia, Pa.

[21] Appl. No.: 672,524

[22] Filed: Nov. 19, 1984

Related U.S. Application Data

[63] Continuation of Ser. No. 379,228, May 17, 1982, abandoned.

[51] Int. Cl.$^4$ .............................................. B01D 43/00
[52] U.S. Cl. ......................................... 209/2; 209/211; 209/12; 210/195.3; 210/787; 210/806; 210/907
[58] Field of Search ....................... 209/13, 17, 18, 12, 209/211, 3, 155, 2; 210/787, 788, 805, 806, 512.1, 512.2, 195.1, 195.3, 907; 494/35

[56] References Cited

U.S. PATENT DOCUMENTS

| | | | |
|---|---|---|---|
| 2,550,829 | 5/1951 | LeBaron | 209/155 |
| 3,084,029 | 4/1963 | Barber et al. | 23/223 |
| 3,113,839 | 12/1963 | Barber et al. | 23/165 |
| 3,348,683 | 10/1967 | Wikdahl | 210/84 |
| 3,450,633 | 6/1969 | Siemers et al. | 210/54 |
| 3,486,619 | 12/1969 | Grandelius et al. | 209/211 |
| 3,890,229 | 6/1975 | Eder | 210/73 |
| 3,929,633 | 12/1975 | Visman et al. | 210/49 |
| 3,940,331 | 2/1976 | Rastatter | 209/211 |
| 4,036,664 | 7/1977 | Priebe | 209/211 |

FOREIGN PATENT DOCUMENTS 931527  8/1973  Canada ................................. 209/85

*Primary Examiner*—Frank W. Lutter
*Assistant Examiner*—Wm. Bond
*Attorney, Agent, or Firm*—Frank Ianno; Eugene G. Seems

[57] ABSTRACT

Process for recovery of elemental phosphorus from phosphorus sludge produced in a phosphorus furnace by treating the sludge in a centrifugal separator and separating a fine dirt slimes fraction from a recovered heavy fraction containing the major portion of phosphorus; treating the slimes fraction in hydrocyclones not over one inch (24.4 mm) in diameter to separate two streams, a first phosphorus-poor stream containing particles smaller than 8–15 micrometers, and a second phosphorus-rich stream containing particles larger than 8–15 micrometers; recycling the second, phosphorus-rich stream to the centrifugal separator for phosphorus recovery, and discarding the first, phosphorus-poor stream.

6 Claims, 4 Drawing Figures

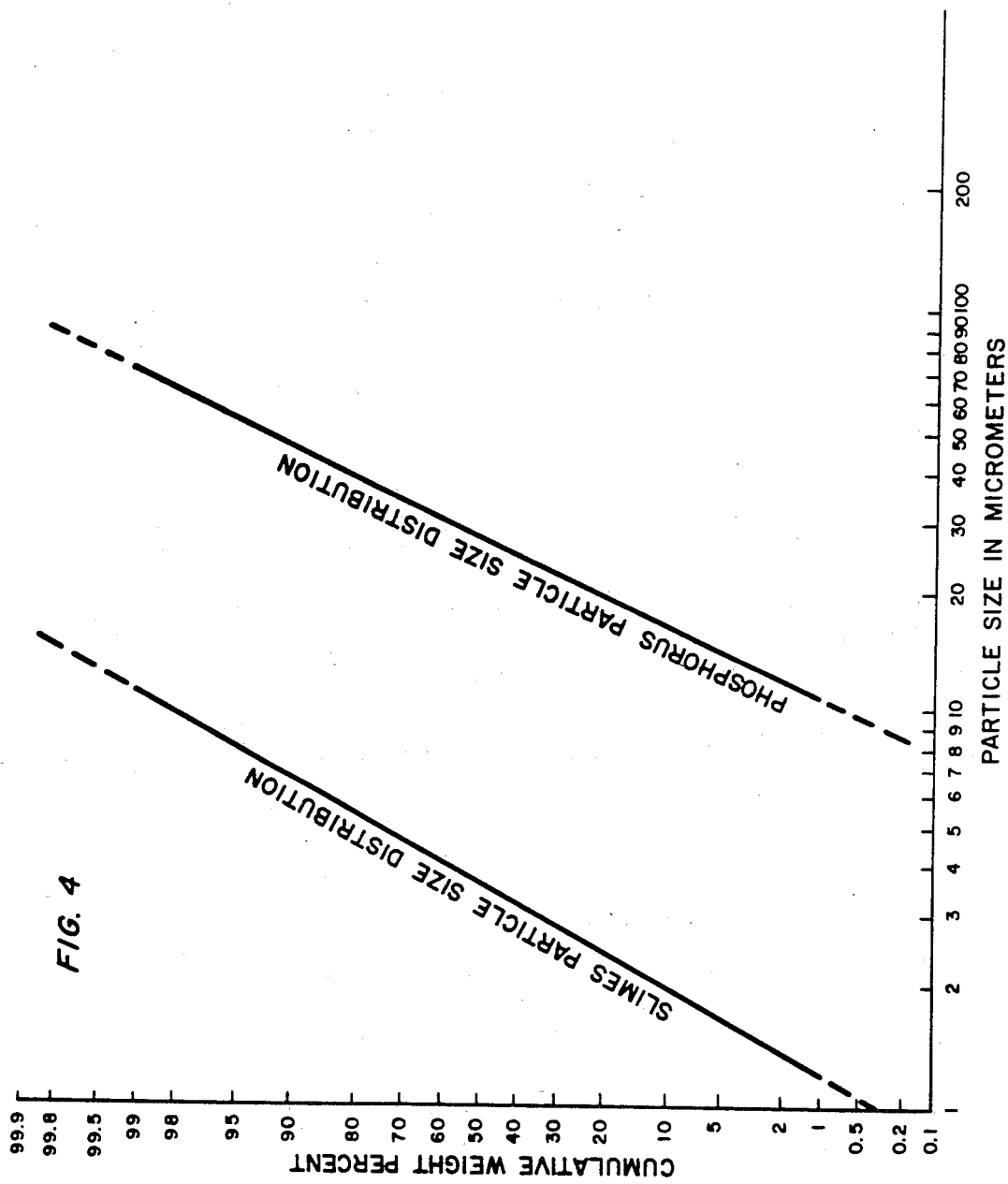

RECOVERY OF PHOSPHORUS FROM DILUTE WASTE STREAMS

This application is a continuation of application Ser. No. 379,228, filed May 17, 1982, now abandoned.

The present invention relates to a process for the recovery of elemental phosphorus from dilute waste streams which are formed during the process of producing phosphorus from phosphate ores. In conventional operations, elemental phosphorus is produced by reacting phosphate ore with carbon at high temperature in an electric furnace. In the operation of such furnaces, the phosphate ore is typically agglomerated, calcined and fed into the furnace with coke to supply carbon, and silica to act as a fluxing agent. Graphite electrodes suspended within the furnace are in contact with the furnace feed and form a melt zone at the base of the electrodes where the phosphate ore is reduced to phosphorus.

In order to prepare the phosphate ore for use in the furnace, the ore is crushed, agglomerated by briquetting or pelletizing, and then is sintered or calcined into compact shapes to remove volatile elements from the ore. This procedure for preparing phosphate ore into briquettes suitable for use in a phosphorus furnace, is described in U.S. Pat. No. 3,760,048 issued on Sept. 18, 1973 in the names of James K. Sullivan et al.

The resulting phosphorus which is formed is vaporized, removed from the furnace, cleaned by electrostatic precipitators and condensed in one or more condensation steps by direct contact with water to form an aqueous slurry of phosphorus. The resulting phosphorus condensate separates when settled in collection sumps or tanks into three layers; a bottom layer of the desired elemental phosphorus, an intermediate layer of phosphorus sludge, and an upper layer of water containing dissolved phosphorus and fine particulate phosphorus.

The phosphorus sludge layer is an emulsion of phosphorus and water with varying amounts of fine dirt slimes mostly in the water phase, and some larger, gritty, abrasive material. The average composition is about 50% by weight phosphorus, 40% by weight water and about 10% by weight dirt. The phosphorus sludge emulsion is believed to be stabilized mainly by very fine dirt slimes which separate the phosphorus globules and by polymeric phosphorus sacs around the globules with the indicated formula $(P_4OH)_n$. These sacs form a membrane around the globules. The outer surface is hydrophilic (attracted to water) and along with the slimes prevents globule coalescence.

Organic tars and dirt trapped within the condensed phosphorus globules are additional stabilizing agents. The fine dirt from the electric furnace is carried with the gas through the electrostatic precipitators. It is believed that the polymeric phosphorus sacs are formed typically from air leakage into the furnace, precipitator, and condenser system.

To recover the phosphorus from the phosphorus sludge, prior workers utilized such techniques as decantation (to permit as much phosphorus as possible to settle from the sludge layer), distillation of the sludge to vaporize the phosphorus, flocculating agents to settle the sludge such as animal glue, alum and the like and finally, centrifugation of the sludge to separate the phosphorus content of the sludge layer. An additional treatment is oxidation of the film by oxidizing agents, for example, chromic acid and the like. Of these, centrifugation appears to be cost effective for separating the greatest amount of phosphorus possible commensurate with the expense and time for carrying out such sludge treatment. This is described in U.S. Pat. No. 3,084,029 issued on Apr. 2, 1963 in the names of Barber et al.

In this process of centrifuging the phosphorus sludge to recover phosphorus, unfortunately, small phosphorus globules are swept up and out of the centrifuge along with the slimes and some larger dirt (medium dirt) with the centrifuge waste water. This medium dirt and tars cause further problems in the centrifuge in that local areas may plug completely, thus forcing channeling or increased velocity which sweeps out more phosphorus globules with the centrifuge waste water. These phosphorus losses, that is, up to 15%, are a substantial amount of the feed phosphorus which is unavoidably swept out and lost in centrifuge waste water from the centrifuge operation.

The recovery of the phosphorus from the slimes in the centrifuge waste water becomes very difficult because of the close size and similar specific gravity of these two constituents of the centrifuge waste water. In some cases, as little as five micrometers in diameter separates the size of these materials. Specifically, the dirt slimes lie mostly in the 2–10 micrometers diameter size range with an apparent specific gravity of about 1.8, while the phosphorus is mostly in the 15–100 micrometers diameter range with a specific gravity of about 1.73.

As a result of the inability, heretofore, of making such a sharp separation, substantial amounts of phosphorus (that is, up to 15% of the $P_4$ in the sludge) have found their way out of the plant and into centrifuge waste water ponds, where it has not been found able to recover such waste phosphorus.

It has now been found that phosphorus can be recovered in high yields from phosphorus sludge produced in an electric furnace by passing the sludge into a centrifugal separator, separating a heavy fraction containing the major portion of phosphorus in the sludge with heavy dirt, separating a light fraction containing fine dirt slimes and a minor amount of phosphorus, introducing the light fractions into hydrocyclones each having a diameter not over about one inch under sufficient pressure to effect separation of particles greater than about 8–15 micrometers from particles smaller than about 8–15 micrometers, recovering an underflow stream containing the preponderance of the phosphorus along with dirt, recycling phosphorus from said underflow stream to the centrifugal separator, removing an overflow stream containing slimes and residual amounts of phosphorus, and recovering phosphorus from said heavy fraction from said centrifugal separator.

BRIEF DESCRIPTION OF THE DRAWINGS

In the drawings,

FIG. 4 illustrates the size distribution of phosphorus and slime particles.

In carrying out the present invention, it is important that the phosphorus which is contained in the sludge in the various stages be maintained within the treatment stages in the plant and not exit from the plant with the slimes into the waste water ponds. It is the ability to separate the slimes and send them to waste treatment ponds with a very minimum of phosphorus that distinguishes the present process over the prior art. Once phosphorus and slimes leave the processing area of the plant and are pumped to the waste ponds, the phosphorus in these ponds is virtually impossible to recover by normal, economically feasible methods presently in use.

Figure 1:
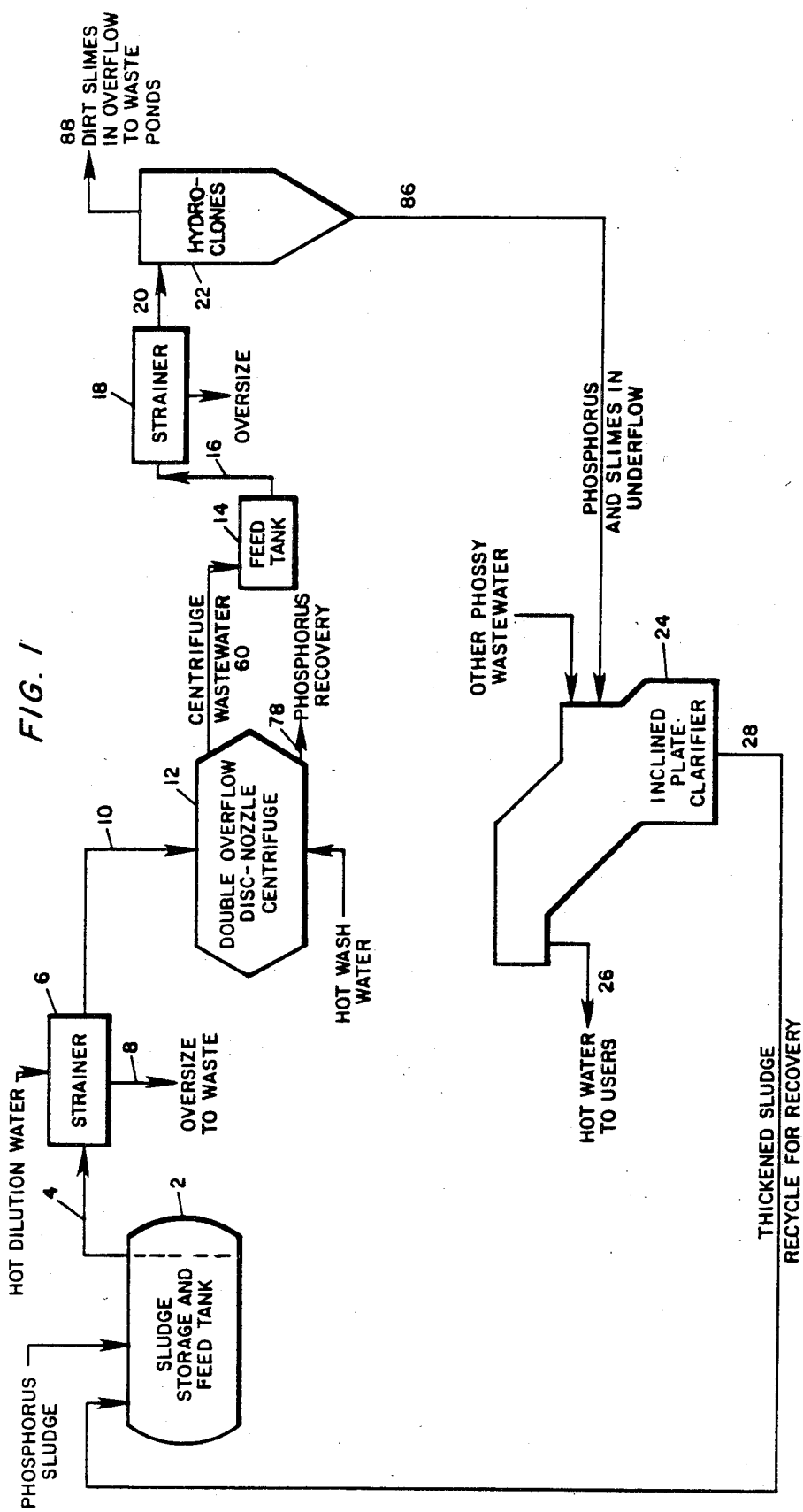
FIG. 1 illustrates a flow sheet for carrying out the process steps of the present system.
Figure 2:
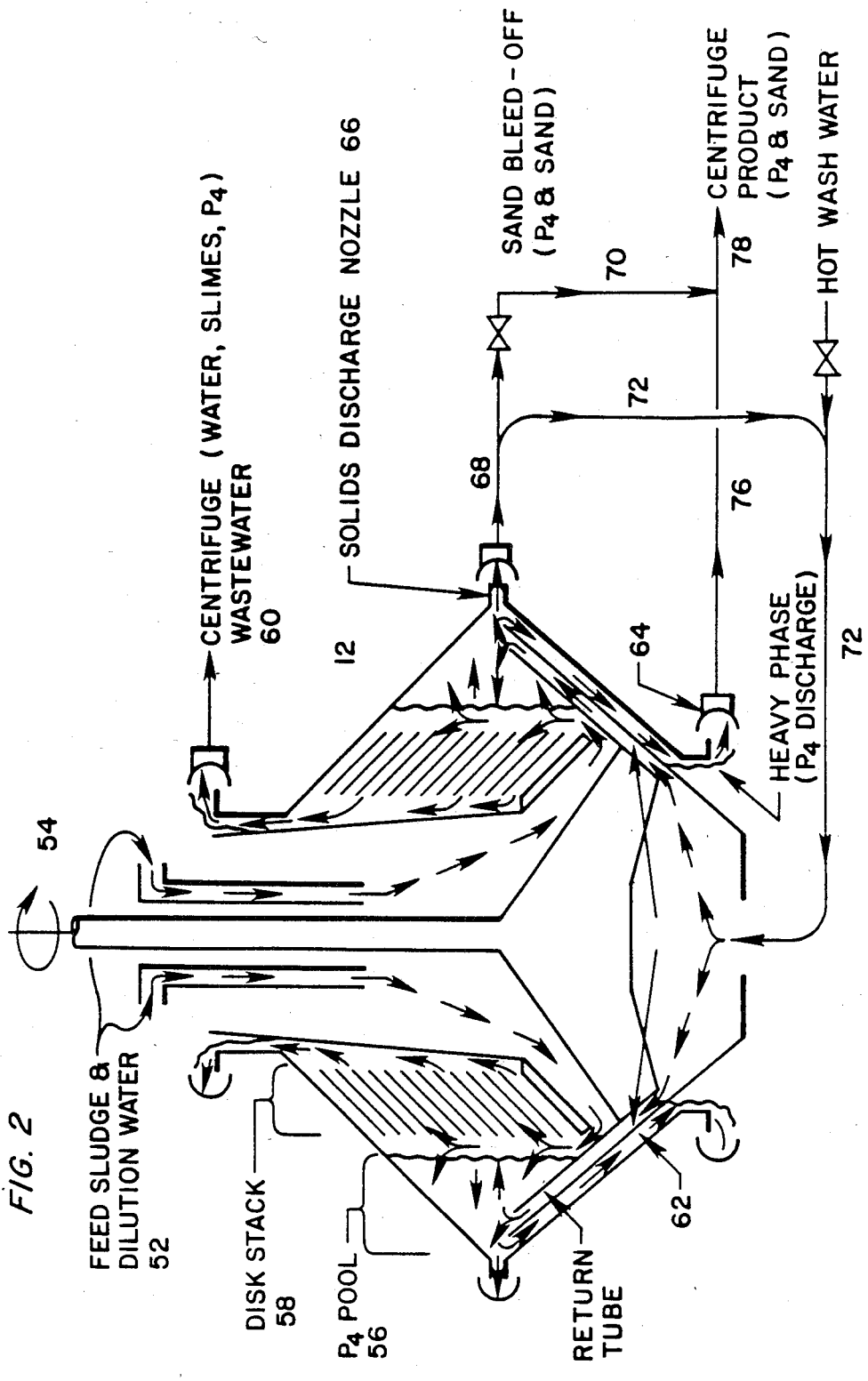
FIG. 2 illustrates details of the centrifuge for dewatering and separation of components.
Figure 3:
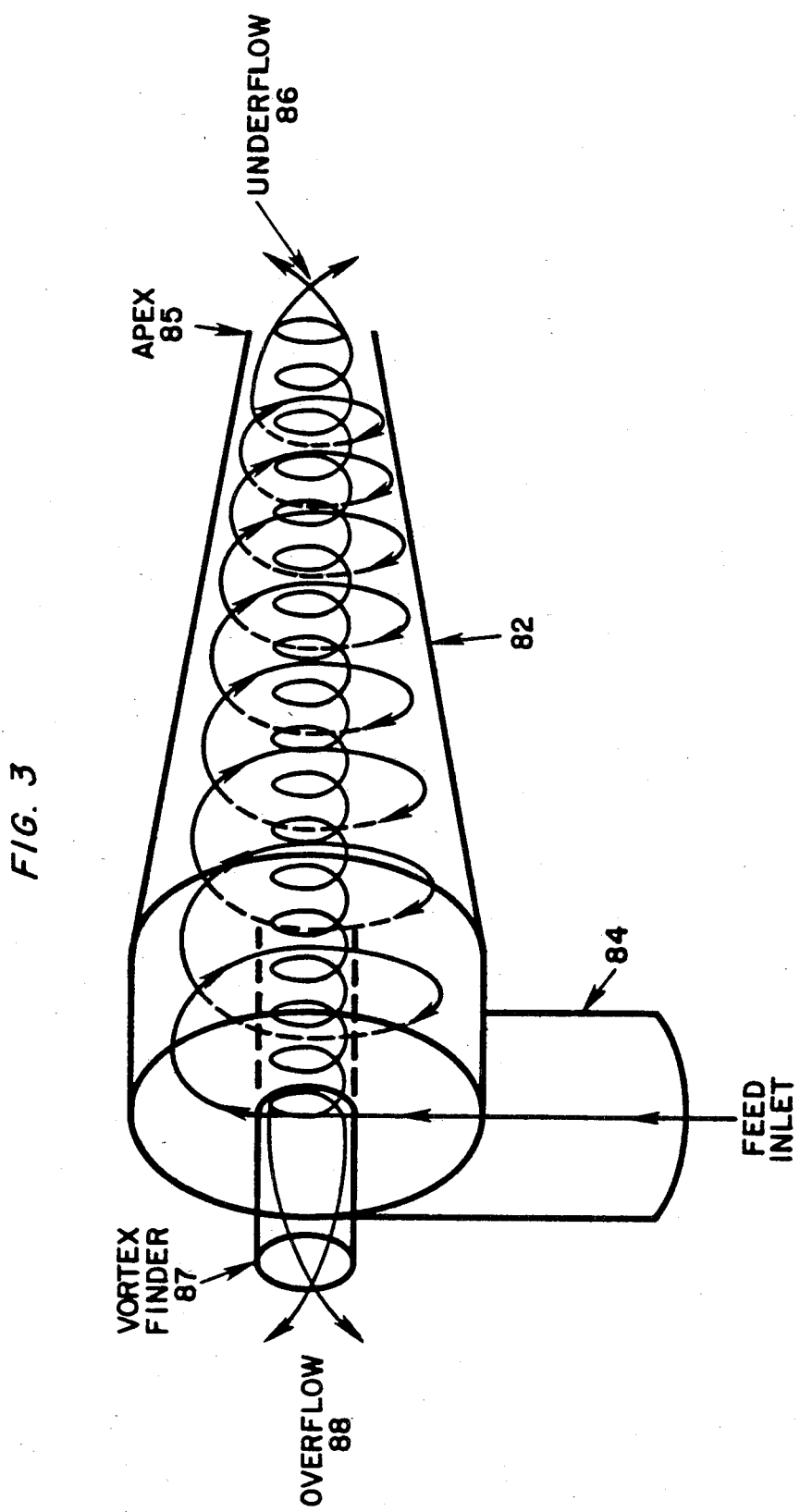
FIG. 3 illustrates details of the hydrocyclone for separation of components.

The present invention can best be described with reference to the attached drawings. In FIG. 1 of the drawings, there is shown a schematic flow sheet for carrying out the subject system. FIG. 2 illustrates details of the centrifuge employed in FIG. 1. FIG. 3 illustrates the structure of a hydrocyclone and its mode of operation. FIG. 4 illustrates the size distribution of phosphorus and slimes particles in phosphorus sludge, with the horizontal axis defining the size (diameter of the particles in micrometers and the vertical axis defining the cumulative weight percent of these particles as a function of particle size. For example, slimes having particle diameters up to 2 micrometers constitute 10 weight percent of the total slimes present.

In FIG. 1, the phosphorus sludge is taken from the storage tank 2 or other receptacles into which phosphorus condensate is collected and is removed and first sent through line 4 to strainer 6 to remove large particles from the sludge. These oversize particles may take the form of unreacted chunks of briquettes, rocks, silica particles or process impurities and are removed through line 8 and sent to waste. These particles have to be removed prior to processing otherwise they will plug the outlet ports of the equipment used for separating the phosphorus from the non-phosphorus components. Hot water is added to the strainer 6 to facilitate separation.

After the stream of phosphorus sludge has been strained of its larger sized particles, it is then passed via line 10 to a centrifuge 12 where coagulation of the major portion (that is, up to about 90%) of the phosphorus can take place. The centrifuge 12 which has been found suitable for this purpose is technically described as a double overflow, disc-nozzle centrifuge with continuous recycle of solids for internal washing and is illustrated in FIG. 2. In its basic operation, the centrifuge separates coalesced phosphorus and heavy dirt (dirt having an equal or higher specific gravity than phosphorus) in one stream from dirt slimes which have a diameter of about 2–10 micrometers.

Phosphorus sludge, usually diluted with hot water, enters the centrifuge 12, detailed in FIG. 2, through a stationary nozzle 52 and is accelerated to full speed by vanes, not shown, in the feedwell. In the illustration shown in FIG. 2, the material travels down and outward to enter the separation area of the bowl. The centrifuge 12 is rotated via shaft 54 at a speed to exert a centrifugal force of about 400–1200 gravities in the separation areas of the centrifuge. Large globules of phosphorus settle outward rapidly into the pool of phosphorus 56, along with grit or sand in the sludge with a relatively high density. Smaller phosphorus globules, along with lighter and smaller dirt (slimes) are carried across the pool's surface and swept inward to the disc stack 58. The disc stack 58 is a miniature inclined plate clarifier within the centrifuge and operates on the same principle as static inclined plate clarifiers, for example, a Lamella clarifier. The phosphorus globules and dirt swept into the disc stack 58 are driven towards the disc surface where they are concentrated and slide down the plate eventually dropping off into the pool of phosphorus 56. Lighter material is swept up and out of the disc stack 58 and exits as a light phase discharge 60 called "centrifuge waste water."

The phosphorus globules and dirt which have migrated into the phosphorus pool 56 travel outward to the rotor periphery. The excess heavy phase moves up a channel 62 along the edge of the bowl, and is thrown out to a heavy phase discharge exit 64. The remainder of the stream, comprising the bulk of the phosphorus and heavy dirt, passes out through discharge nozzle 66 about 1.8–2.6 mm in diameter. This stream 68 exits the centrifuge 12 and a small portion of the stream 70 is bled off for discharge. The remainder of the stream 72 is returned along with hot wash water to the centrifuge 12 where it is once again accelerated and reinjected into the heavy phase pool via inlet 74. The wash water injected with the recycled solids stream 72 migrates inward and out of the centrifuge and provides counter-current washing for the dirt and phosphorus moving outwards from the pool 56. The heavy solids that travel through the nozzle 66 and back to the centrifuge often make many round trips during which they are water washed before they are finally discharged out of the solids bleed-off 70.

Due to the nature of the centrifuge and the physical laws operating in it, certain sizes and densities of dirt particles and phosphorus particles preferentially concentrate in the separating zones. These are particles which are too light to sink into the phosphorus pool, but heavy enough not to be easily swept up out of the disc stack 58. These particles will concentrate until settling is hindered and are swept up and out by increased water velocity, with the centrifuge waste stream 60.

Unfortunately, a considerable amount of small phosphorus globules are also present and exposed to this effect, so that they too are swept up and out of the centrifuge and lost with the centrifuge waste water 60. This is further aggravated by dirt which accumulates in the disc stack 58 and restricts flow. Localized areas of the disc stack may plug completely, thus forcing channeling or increased velocity of water in the remaining area which results in sweeping out even more phosphorus.

The solids bleed-off stream 70 is combined with the excess heavy phase in stream 76 from heavy phase discharge exit 64 to form a centrifuge product 78 consisting of phosphorus and heavy dirt. The centrifuge product 78 preferably is sent to the furnace where the phosphorus is vaporized and recovered while the heavy dirt goes out with the slag in the furnace operation.

The light phase that emanates from the centrifuge 60 (also termed centrifuge waste water) contains slimes, and also fine phosphorus globules (droplets) which have diameters mostly in the range of 15–100 micrometers and have a specific gravity of about 1.73. The phosphorus content of this light phase may range anywhere from 1% to 15% of the phosphorus fed from the phosphorus sludge stream. These phosphorus globules do not readily coalesce because they have polymeric phosphorus sacs surrounding them which have an affinity for water and because they are physically separated by dirt slimes.

Returning to FIG. 1, the centrifuge waste water 60, made up principally of these phosphorus particles and slimes, is fed into a feed tank 14 and then through line 16 into a strainer 18 from which it flows via line 20 into one or more hydrocyclones 22 each having a diameter not above about 1 inch (25 mm). The aqueous stream is introduced under a sufficient pressure drop across the hydrocylcone 22 to separate particles into two separate streams, one below and another above about 8 to 15 micrometers. The hydrocyclone 22 as shown in FIG. 3 has a cone shaped unit 82 with a tangential opening 84 in its side so that material fed into the opening 84 rotates and generates high centrifugal force causing heavier material to be separated through an opening in the apex 85 of the hydrocyclone (called the "underflow") while the lighter material is removed through a vortex finder opening in the head 87 (called the "overflow").

In the present process, the hydrocyclone must be operated so that the separatory point between the particles is in the range of about 8-15 micrometers, thereby assuring that the major portion of phosphorus entering the hydrocyclone is removed in the underflow stream while the overflow stream from the hydrocyclone contains the slimes fraction with extremely small amounts of phosphorus.

This separation is illustrated in FIG. 4, wherein the size distribution of the phosphorus and slimes particles in the phosphorus sludge is shown. The horizontal axis defines the diameter of the particles, in micrometers, while the vertical axis defines the cumulative weight percent of these particles as a function of particle size. As is evident from this figure, a separation of particles having a size larger than 8-15 micrometers from smaller sized particles will effectively separate slimes from phosphorus with minimum carry over of phosphorus into the smaller sized slimes fraction.

A pressure drop of from 20 to 40 lbs per square inch (138-276 kilopascals) measured from the hydrocyclone inlet 84 to the overflow exit point 88 has been found effective to achieve this separation. In order to use small cyclones of this type in a plant, they usually are set up in parallel with a common header so that banks of hydrocyclones can be used to process large volumes of centrifuge waste water. Where desired, some of the hydrocyclones can be put in series to assure that the desired separation efficiency is achieved.

The use of hydrocylcones in this fashion permits the slimes to be removed as overflow 88 while the heavier stream of phosphorus and some slimes are removed as the underflow 86 of the hydrocyclones. This means that essentially all the phosphorus remains in the underflow stream 86 of the hydrocyclone and can be recycled and recovered while the overflow stream 88, substantially free of the phosphorus, can be sent to the ponds for disposal. In the process of going through the hydrocyclone, some of the phosphorus is also coalesced, forming larger particles which particles will be removed by the centrifuge 12 when they are recycled to it.

As shown in FIG. 1, the underflow stream 86 from the hydrocyclone 22 desirably goes to a clarifier 24, preferably one having inclined plates such as the Lamella clarifier. In the clarifier 24, the phosphorus settles to the bottom while the water containing dissolved phosphorus (phossy water) rises and exits the top of the clarifier 24. The hot phossy water stream 26 is sent to the disposal ponds in part, with the remainder going to other units requiring hot water, while the phosphorus and some dirt in the bottom stream 28 are recycled to the centrifuge. The use of the clarifier 24 is desirable to minimize the load on the centrifuge by not recycling all of the bottom stream 86 from the hydrocyclone 22. However, if the bottom stream from the hydrocyclone 86 is not too large it can be recycled directly to the centrifuge 12 without being first treated in clarifier 24.

The underflow stream 86 from the hydrocyclone 22 contains larger particles of coalesced phosphorus than that fed to hydrocyclone 22, and thus phosphorus can be more easily separated by the centrifuge 12 and removed in the centrifuge heavy stream 78. This heavy stream 78 is preferably returned to the electric furnace for recovery of the phosphorus. By operating in this fashion, it has been found that over 99% of the phosphorus in the sludge can remain within the separatory units of the plant and eventually can be recycled to the furnace for final recovery.

It was completely unexpected to find that hydrocyclones could make a sharp cut sufficient to separate slimes from substantially all of the molten phosphorus globules. This separation was found possible because the slimes are mostly in the 2-10 micrometers diameter size whereas the phosphorus globules are mainly in the 15-100 micrometers diameter size, and because the hydrocyclone was found able to make a separation in the 8-15 micrometers range and produce two streams each differing in particle size, and consequently also differing in phosphorus content. By operating in this manner, the underflow stream of the hydrocyclone will retain most of the phosphorus and upon recycling this stream to the centrifuge, either directly or indirectly through a clarifier interposed between the hydrocyclone and the centrifuge, recovery of the phosphorus can be achieved.

This fine separation performed by the hydrocyclone requires the use of high centrifugal forces and normally can not be done with hydrocyclones which are substantially larger in diameter than about 1 inch (25 mm). The larger cyclones apparently do not obtain the necessary centrifugal forces to efficiently recover the phosphorus globules as underflow while rejecting slimes in the overflow stream.

As an alternate embodiment, it is possible to interpose hydrocyclones of the same type as those identified as 22 in FIG. 1, before centrifuge 12. In this case, the preliminary hydrocyclones would feed their underflow to the centrifuge 12, while their overflow would be combined with centrifuge waste water 60 and be fed to hydrocyclone 22. This would minimize the amount of slimes being fed to the centrifuge and would minimize the amount of phosphorus bound up with the slimes that would exit in the waste water stream 60 from the centrifuge 12. In this embodiment, it may be desirable to dilute the phosphorus sludge with water and/or subject it to high agitation to free up the phosphorus and dirt particles so they are able to act as individual particles rather than consolidated masses, prior to introduction of the sludge into the preliminary cyclones.

The following examples are given to illustrate the invention and are not deemed to be limiting thereof.

EXAMPLES

1A—Example of the Invention

Phosphorus sludge from a phosphorus furnace containing about 50% by weight phosphorus, 10% by weight dirt was separated into a heavy stream containing phosphorus and heavy dirt, and a centrifuge waste water stream containing fine dirt slimes and fine globules of phosphorus. The hot centrifuge waste water stream issued from the centrifuge at a rate of 27 gallons (102 liters) per minute and contained enough phosphorus and dirt to yield 485 lbs (220 kg) of phosphorus per hour and 195 lbs (88.5 kg) of dirt slimes per hour. This stream was fed into a 300 gallon (1135 liter) tank until full and then pumped at a rate of 4.04 gal/min (0.255 liters/sec) and under a pressure of 20 lbs per square inch (138 kilopascals) into a hydrocyclone having a diameter of 1-inch (25.4 mm), a vortex finder diameter of 0.28 inch (7.1 mm) and an apex diameter of 0.125 inch (3.2 mm) (Krebs Model PC-1). The average underflow from the apex of the hydrocyclone was 1.24 gallons per minute (0.0782 liters/sec) and contained enough phosphorus and dirt to yield 94.4 lbs (42.8 kg) of phosphorus per hour and 19.3 lbs (8.75 kg) of dirt per hour. The overflow from the hydrocyclone yielded 2.8 gallons per minute (0.177 liters/sec) and contained enough phosphorus and dirt to yield 0.78 lbs (0.35 kg) per hour of phosphorus and 12 lbs (5.44 kg) per hour of dirt. This shows the hydrocyclone had an average phosphorus efficiency of 99.1% and an average dirt (slimes) removal efficiency of 38.3%. The above findings were the results of five duplicate runs whose results were averaged to give the above results.

1B—Comparative Example

In order to show the criticality of the size of the hydrocyclones used in Example 1A—The example was repeated using exactly the same solution, but employing as the hydrocyclone a 4-inch diameter (102 mm) hydrocyclone [Krebs Model P4 (CS)] having a 10-inch (254 mm) additional cylindrical section added, with an apex 0.56-inch (14.2 mm) in diameter and a vortex finder 1-inch (25.4 mm) in diameter. The average flow through the hydrocyclone was 45.6 gallons per minute (2.88 liters/sec) at a pressure of 20 lbs per square inch (138 kilopascals). The average underflow from the apex was 14.6 gpm (0.921 liters/sec) and contained enough phosphorus and dirt to yield 863 lbs (391.5 kg) per hour of phosphorus and 187 lbs (84.8 kg) per hour of dirt. The average overflow was 31 gpm (1.956 liters/sec) and yields 106 lbs (48.1 kg) of phosphorus per hour and 147 lbs (66.7 kg) of dirt per hour.

This illustrates that hydrocyclone efficiency for phosphorus recovery was only 89.06% (compared to 99.1% for the 1-inch hydrocyclone) and 44.01% for dirt (slimes) removal. Use of this size hydrocyclone compared to the 1-inch diameter cyclone would result in a 10.04% increase of phosphorus in the overflow stream, which would exit to a waste pond and be lost.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for recovering phosphorus from phosphorus sludge, produced in an electric furnace by reductive heating of agglomerated phosphate shale which comprises, passing said sludge into a centrifugal separator having a rotating bowl which is capable of exerting sufficient centrifugal pressure to break a stable phosphorus emulsion in the sludge and coalesce phosphorus globules present within said sludge and a subsequent recycle underflow stream from a hydrocyclone, coalescing phosphorus globules in said centrifugal separator removing a heavy fraction from one outlet of said separator containing the major portion of phosphorus in coalesced form along with heavy dirt, removing a light fraction containing fine dirt slimes and a minor amount of uncoalesced phosphorus from a second outlet of said separator, introducing said light fraction into a hydrocyclone having a diameter of not substantially larger than about 1-inch under sufficient pressure to effect a separation of phosphorus particles larger than about 8–15 micrometers from slime particles smaller than about 8–15 micrometers, recovering an underflow stream from the hydrocyclone containing a preponderance of the introduced phosphorus particles in a substantially uncoalesced form along with a reduced amount of dirt slimes, removing an overflow stream from the hydrocyclone containing a preponderance of the slimes and reduced amounts of phosphorus, recycling said underflow stream to said centrifugal separator, coalescing phosphorus contained in the recycled underflow stream having a particle size larger than about 8–15 micrometers within said centrifugal separator along with phosphorus globules contained in the sludge, and recovering said heavy fraction containing coalesced phosphorus from said centrifugal separator.

2. Process of claim 1 wherein the underflow stream from said hydrocyclone is passed into a clarifier, wherein the stream stratified into an upper phossy water stream and a lower phosphorus concentrate stream, and the lower phosphorus concentrate stream is recycled to the centrifugal separator for recovery of phosphorus.

3. Process of claim 1 wherein the said light fraction from said separator is introduced into said hydrocyclone at a differential pressure of about 20 to 40 lbs per square inch.

4. Process of claim 1 wherein said sludge is first passed into a preliminary hydrocyclone having a diameter not substantially larger than about 1-inch, removing a preliminary underflow from said preliminary hydrocyclone containing the major portion of phosphorus and introducing it into said centrifugal separator, removing a preliminary overflow from said preliminary hydrocyclone containing separated fine dirt slimes and a minor amount of phosphorus, and passing said preliminary overflow along with said light fraction from said centrifugal separator into said hydrocyclone where particles larger and smaller than about 8–15 micrometers are separated.

5. Process of claim 1 wherein a plurality of hydrocyclones are employed in parallel, and said light fraction from said centrifugal separator is introduced to said hydrocyclones through a common conduit.

6. Process of claim 1 wherein the centrifugal separator separates said sludge into said heavy fraction and said light fraction by rotating a bowl containing said sludge at a speed sufficient to exert a centrifugal force of about 400–1200 gravities on said sludge in the separation areas of the centrifugal separator.

* * * * *